(12) United States Patent
Ngai

(10) Patent No.: US 6,775,327 B2
(45) Date of Patent: *Aug. 10, 2004

(54) HIGH DEFINITION TELEVISION DECODER

(75) Inventor: Chuck Hong Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/836,968

(22) Filed: Apr. 17, 2001

(65) Prior Publication Data

US 2001/0021227 A1 Sep. 13, 2001

Related U.S. Application Data

(63) Continuation of application No. 09/173,454, filed on Oct. 15, 1998, now Pat. No. 6,263,023.

(51) Int. Cl.$^7$ ............................. H04N 7/12; H04N 7/32
(52) U.S. Cl. ................................................. 375/240.25
(58) Field of Search ....................... 375/240.01, 240.03, 375/240.12, 240.16, 240.2, 240.23, 240.25, 240.26, 240.28; 382/232, 236, 238, 250, 251; 386/111; 348/714–716, 718, 705; 370/429; H04N 7/12, 7/32

(56) References Cited

U.S. PATENT DOCUMENTS

| | | | |
|---|---|---|---|
| 5,191,418 A | 3/1993 | Tran ............................ 358/147 |
| 5,280,349 A | * 1/1994 | Wang et al. ............. 375/240.23 |
| 5,363,097 A | 11/1994 | Jan .............................. 341/67 |
| 5,379,356 A | 1/1995 | Purcell et al. ................ 382/56 |
| 5,491,480 A | 2/1996 | Jan et al. ..................... 341/67 |
| 5,504,528 A | * 4/1996 | Koshiro et al. ......... 375/240.01 |
| 5,510,842 A | 4/1996 | Phillips et al. .............. 348/426 |
| 5,532,744 A | 7/1996 | Akiwumi-Assani et al. 348/390 |
| 5,568,139 A | 10/1996 | Yoon ............................ 341/67 |
| 5,576,765 A | * 11/1996 | Cheney et al. ......... 375/240.14 |
| 5,619,259 A | 4/1997 | Song et al. .................. 348/181 |
| 5,625,355 A | 4/1997 | Takeno et al. ................ 341/67 |
| 5,638,533 A | 6/1997 | Law ............................ 395/484 |
| 5,640,210 A | 6/1997 | Knee et al. .................. 348/469 |
| 5,668,548 A | 9/1997 | Bakhmutsky ................ 341/67 |
| 5,675,424 A | 10/1997 | Park ............................ 358/426 |
| 5,737,019 A | * 4/1998 | Kim ....................... 375/240.25 |
| 5,778,143 A | * 7/1998 | Boyce ........................ 286/111 |
| 5,847,762 A | * 12/1998 | Canfield et al. ....... 375/240.15 |
| 5,910,824 A | * 6/1999 | Yu ............................. 348/714 |
| 5,943,508 A | * 8/1999 | Penney et al. ............. 348/705 |
| 5,963,260 A | * 10/1999 | Bakhmutsky ........... 375/240.24 |
| 5,991,304 A | * 11/1999 | Abramson .................. 370/429 |
| 6,100,932 A | * 8/2000 | Boyce et al. ........... 375/240.16 |

OTHER PUBLICATIONS

"Format Converter on TV chips" by Junko Yoshida, Electronic Engineering Times, Apr. 20, 1998 pp. 53, 80.
"Direct Rambus Technology Disclosure," DL–0040–00 by Rambus, Inc., Mountain View, CA, Oct. 1997 16 pages.
"MPEG Video Compression Standard", by J. L. Mitchell et al., Chapman & Hall, New York, 1996, pp. 23–25.

* cited by examiner

Primary Examiner—Richard Lee
(74) Attorney, Agent, or Firm—William H. Steinberg, Esq.; Kevin P. Radigan, Esq.; Heslin Rothenberg Farley & Mesiti P.C.

(57) ABSTRACT

A video decoder for decoding data at a high rate uses a plurality of slower slice decoders. A common memory is shared by all slice decoders drastically reducing storage requirements of individual decoders. Slices are allocated to decoders optimally in response to busy signals providing improved performance over known methods. HDTV signals are decoded using a plurality of ordinary television resolution decoders. Multiple data streams are also decoded.

7 Claims, 3 Drawing Sheets

HIGH DEFINITION TELEVISION DECODER

This is a continuation of application Ser. No. 09/173,454, filed Oct. 15, 1998 now U.S. Pat. No. 6,263,023.

TECHNICAL FIELD

The invention relates to video decoders and in particular to those video decoders for decoding MPEG encoded video streams. Even more particularly the invention relates to those decoders which decode High Definition Television encoded signals using a plurality of slice decoders.

BACKGROUND OF THE INVENTION

The storage and transmission of moving video images involves handling tremendous amounts of data to accurately describe the images. Data compression in both space and time techniques are therefore routinely used to reduce this overwhelming quantity of data to manageable proportions. The compressed data can then be stored for example on a digital video disk (DVD) or transmitted through a digital television channel or some other transmission network such as cable TV, satellite broadcast, or a high speed computer network.

Standards have been adopted to define the encoding, i.e. compression of various video data streams. One such standard is the MPEG-2 ISO/IEC 13818-2 International Standard of the International Telecommunications Union located in Geneva, Switzerland dated November 1994. In accordance with this standard, decoders have been developed. The decoder is located near the final viewing screen such as in a set-top-box positioned on an ordinary television receiver. The decoder may also be located in a personal computer of the tower, desktop, or laptop styles. The decoder accepts the MPEG-2 encoded video stream, decodes it back to a good rendition of the original sequence of images and sends the data in proper format to the television set or computer screen to be viewed. In the case of television, the MPEG-2 standard defines a Main Level having a maximum picture size of 768 pixels per line and 567 lines per frame. This Main Level is adequate for existing television standards (i.e., NTSC, PAL and SECAM). Hardware decoders have been developed which are capable of processing video signals at this Main Level of resolution at the 30 frames per second rate needed by the existing television standards. One such decoder is described in U.S. Pat. No. 5,576,765 by Cheney, et al.

A High Level is also defined in the MPEG-2 Standard as having a maximum of 1,920 pixels per line with 1,152 lines per frame. This High Level is intended for high definition television (HDTV) encoding. Images encoded according to the High Level standard at 30 frames per second have more than 5 times the data rate of Main Level images. This higher data rate cannot in general be decoded by equipment used to decode Main Level data streams. Yet, to be effective, decoders need to be relatively inexpensive while having sufficient processing speed to handle these High Level data streams in real time when located at a viewer's HDTV receiver.

A number of decoders e.g. those capable of handling Main Level data streams, can be operated in parallel to improve the overall effective speed. For example, the encoded data stream can be demultiplexed and applied to N parallel processing paths. However each path will require a buffer necessary to temporarily hold its portion of the demultiplexed data. The output signals from the N paths are then multiplexed to form a single data stream which is a rendition of the original unencoded images. These images can then be displayed e.g. on a HDTV screen. In practice with such parallel decoding apparatus, the size of buffer memories required, tends to be quite large because the encoded image data is of variable length so that the workload is invariably distributed unevenly over the N paths. It may even be required that each of the N buffer memories have a size S equal to the size of a buffer memory required by a single path but higher speed decoder. Yoon, in U.S. Pat. No. 5,568,139 partly reduces this burdensome memory requirement through use of a single provisional buffer memory of this same size S followed by smaller buffer memories in each of N parallel paths.

Akiwumi-Assani in U.S. Pat. No. 5,532,744 allocates incoming encoded video data to N data paths in sequence based on the number of data bits or slices received. A slice defines a portion of the picture area. Each data path has to have a buffer of a size sufficient to hold approximately 1/N of S. However, because of the great variation in time required to decode differing portions of the picture area, there will be a great variation in the completion times of the N paths. One decoder will invariably have to handle much more than it's share of the decoding workload. A fairly large number of decoders is therefore needed to achieve a modest increase in processing speed. That is, N parallel paths will not produce a N times increase in throughput.

Park in U.S. Pat. No. 5,675,424 uses either four or two decoders in parallel to partly decode an MPEG-2 macroblock. Each decoder handles an 8×8 block or 8×16 block of a 16×16 macroblock. However, Park requires use of a high speed motion compensator because motion compensation can be performed only on a full macro block basis. The parallel paths of Park therefore do not fully overcome the need for high speed circuitry to decode HDTV or other high resolution video formats.

Jan, in U.S. Pat. No. 5,363,097 also provides a partial solution to achieving high data rate decoding by first decoding variable length data into fixed length data for subsequent parallel processing. The fixed length data is placed in one of a plurality of data buffers each of which can operate at a lower data rate than would otherwise be required if a single data buffer were placed ahead of the variable length decoding. However, Jan notes that the overall total size of the data buffers has to be several times larger than would otherwise be required of a single buffer.

Phillips, et al. in U.S. Pat. No. 5,510,842 describes a parallel decoder in which an image is divided horizontally into vertical sections. Incoming code and data are passed to the processors based on the horizontal starting position of the slice in the final image. In this arrangement, in order to perform motion compensation, each decoder includes a memory that holds data representing the entire image. workload will not usually be divided optimally between the decoders because of the variability between sections.

Purcell, et al. in U.S. Pat. No. 5,379,356 also divides the HDTV image horizontally into vertical sections with the same exposure to variability of workload between sections. A separate decoder and buffer memory are used to decode the data for each section. Each buffer memory bank stores data for one section. However, the corresponding decoder also has access to a portion of the data of its neighbors to the left and to the right. Access to the neighbor's data is necessary when motion compensation requires access across the boundaries of the sections. In order to avoid the problem of one bank of memory being accessed by more than one decoder at a time it is required that the decoders operate in lock-step, thereby limiting their individual performance.

It is evident that all of these approaches to parallel decoding suffer from either a less than optimal distribution of workload or a need for a much larger buffer memory, or both. An uneven workload requires more parallel paths to handle the load.

In accordance with the teachings of the present invention, there is defined a new parallel decoding structure and method which is capable of providing high speed decoding using a minimal number of individual decoders and a minimal buffer memory size. It is believed that such an apparatus and method would constitute a significant advancement in the art.

OBJECTS AND SUMMARY OF THE INVENTION

It is therefore a principal object of the present invention to enhance the video decoding art by providing an apparatus having improved data throughput.

It is another object to provide such an apparatus which makes optimal use of decoding and data buffer hardware.

It is yet another object to provide such an apparatus which can be relatively inexpensively produced and yet have sufficient power to decode high speed video signals in real time.

These and other objects are attained in accordance with one embodiment of the invention wherein there is provided a video decoder comprising means for receiving video data encoded into data slices, means for storing a plurality of the data slices with each of the stored data slices having a slice address, a plurality of slice decoders coupled to the storing means for decoding the stored data slices, with each slice decoder having means for generating a busy signal, and a video stream slicer, coupled to the plurality of slice decoders and the receiving means, for allocating the stored data slices to the slice decoders by sending the slice addresses to the slice decoders in response to the encoded video data and the busy signals.

In accordance with another embodiment of the invention there is provided a method of decoding video data, comprising the steps of receiving video data encoded into data slices, storing a plurality of the data slices with each having a slice address, allocating the stored data slices to a plurality of slice decoders by sending the slice addresses to the slice decoders in response to the video data and to busy signals generated by the slice decoders, and decoding the stored slices with the plurality of slice decoders.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
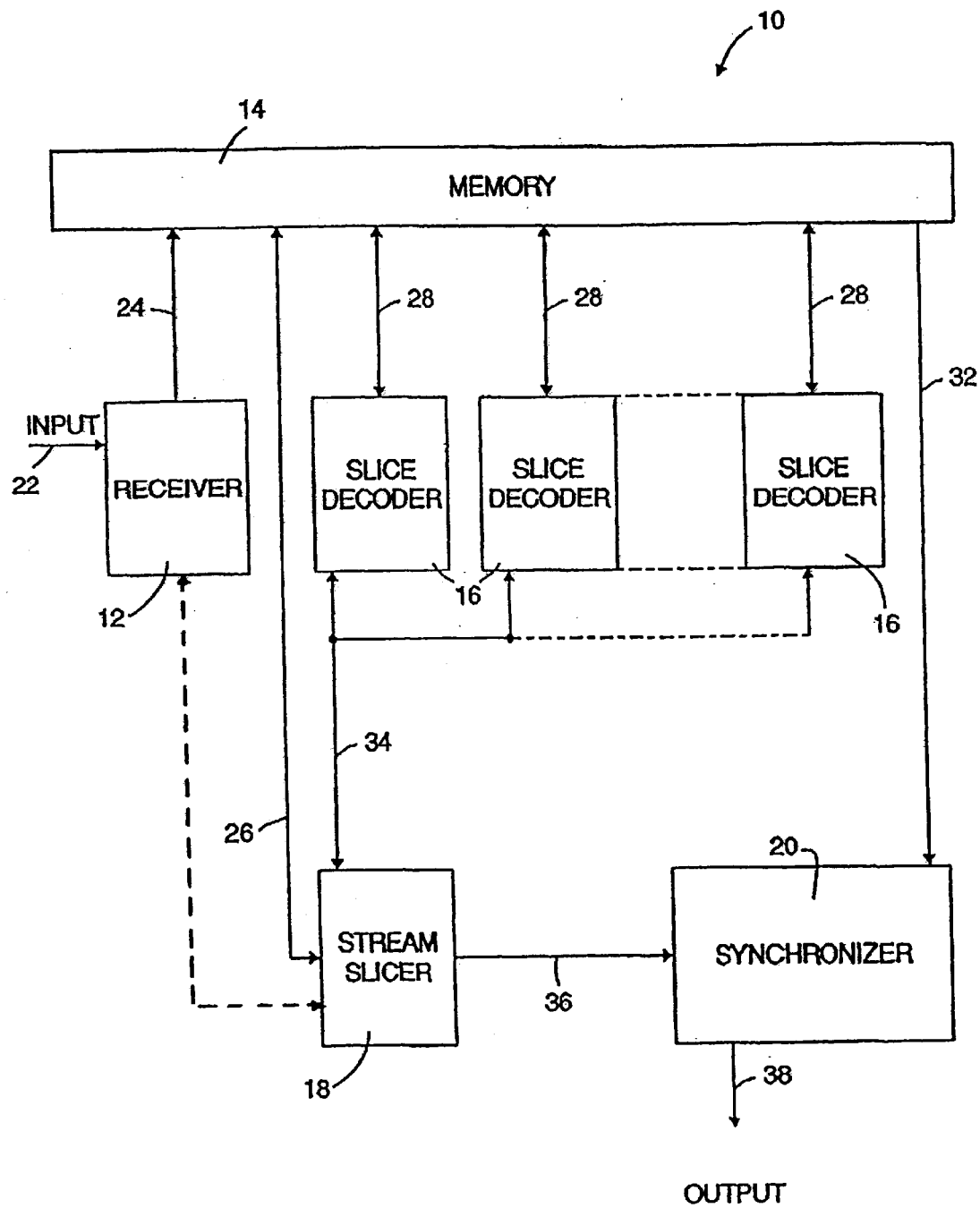
FIG. 1 is a block diagram of a parallel decoder in accordance with the present invention.

In FIG. 1 there is shown an embodiment of a video decoder 10 of the present invention. Video data encoded into data slices is received by receiver 12 through input 22. The video data may be supplied by a wired or fiber optic cable, a satellite dish, a computer drive such as a CD-ROM or DVD (digital video disk) drive or via any other source including a serial or parallel bus. Receiver 12 is appropriately designed to accept the video data in whatever form it is supplied. The video data may be encoded as MPEG-2 data according to the High Level known as HDTV. It may also be encoded as Main Level or any other encoding scheme where slices are defined as specified in the MPEG-2 standard ISO/IEC 13818-2 draft of November 1994. The video data may also be encoded in slices as defined in any other standard, such as MPEG-1, or in any other method known in the art to use slices. The video data may also include multiple data streams whether supplied on separate inputs e.g. separate cables or multiplexed on a single input. The encoded video data is stored in memory 14 which may be any type of device for storing digital data such as a DRAM, SRAM, SDRAM, SGRAM or other type of memory of sufficient speed to accept the video data at the rate at which it is received. Memory 14 may also be a DRAM configured to operate as a RAMBUS™ memory (RAMBUS is a trademark of Rambus Inc.) as described in "Direct RAMBUS Technology Disclosure" DL-0040-00 published by Rambus, Inc. Of Mountain View, Calif., Oct. 1997. The video data may stored by operating memory 14 as a rate buffer using techniques of addressing known in the art of storage operation. Memory 14 is coupled to receiver 12 through interconnection 24.

A plurality of slice decoders 16, in FIG. 1 three are shown, are also coupled to memory 14 through connection 28. Each slice decoder is capable of decoding one or more slices of video data in response to allocation of slices by video stream slicer 18. Slice decoders 16 indicate to stream slicer 18 whether they are busy decoding slices or idle by generating busy signals. The stream slicer monitors the incoming video data by looking for it in memory 14 using connection 26 as shown in FIG. 1 or optionally by a connection (not shown) directly to receiver 12. In either case, the stream slicer allocates slices to slice decoders in response to the video data and the presence or absence of busy signals from the slice decoders 18 by sending slice addresses to the slice decoders. The slice addresses give the location in memory 14 of where the allocated slice can be found. Slice addresses and busy signals are communicated by the coupling 34 shown in FIG. 1.

After decoding a slice, decoders 16 may place the decoded data in a frame buffer which can be located in memory 14. Decoded slices are accumulated in the frame buffer until a complete frame is completed. Synchronizer 20 coupled to stream slicer 18 on coupling 36 and data memory 14 on coupling 32 controls the assembly of the decoded slices into a decoded frame. Output signal 38 from the synchronizer can notify a display generator that a complete frame of data is available for display. The format of the display may be NTSC, PAL, SECAM, HDTV or any other format compatible with the video data supplied.

Figure 2:
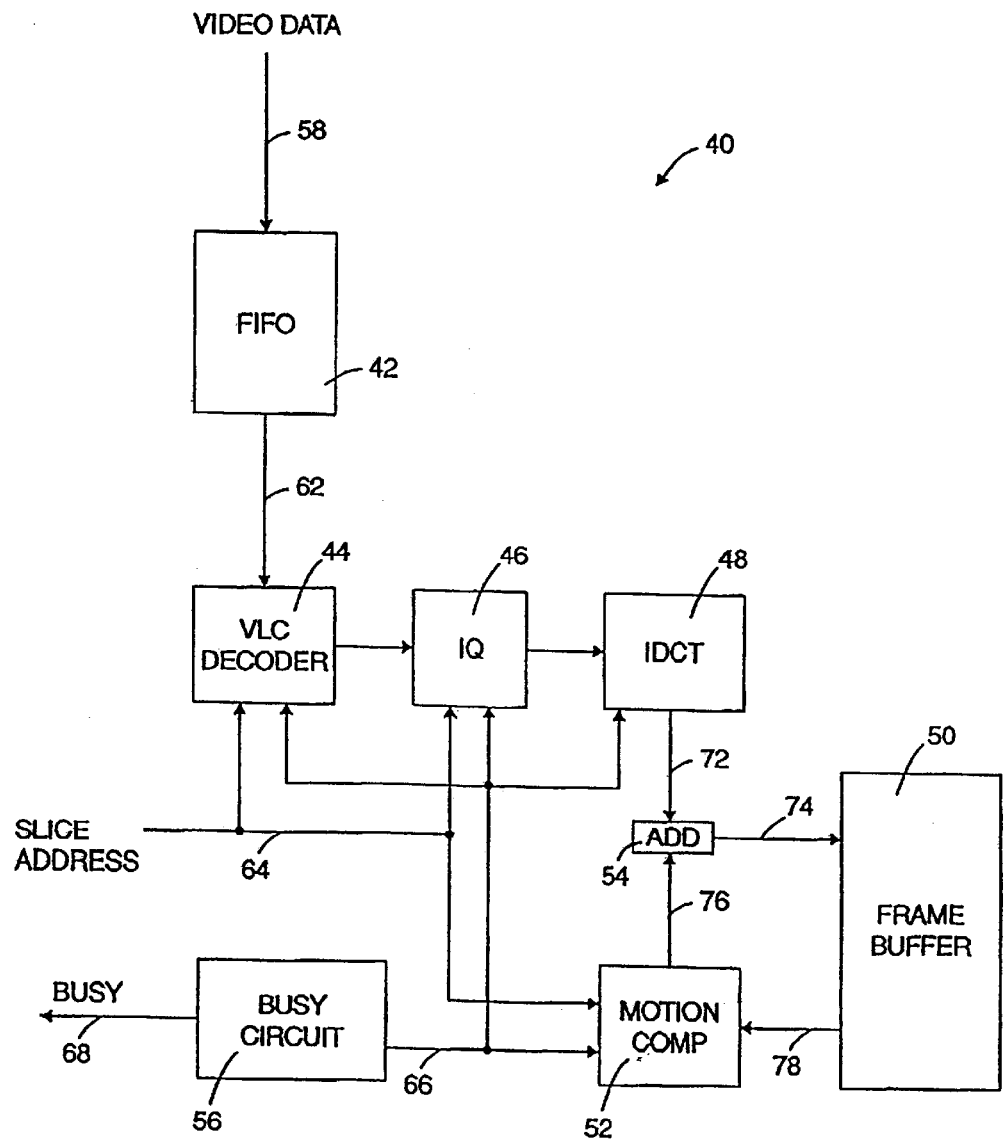
FIG. 2 is an expanded block diagram showing the details of each slice decoder in FIG. 1.

An embodiment 40 of each slice decoder 16 is shown in FIG. 2. In response to a slice address provided on path 64 by the stream slicer 18 of FIG. 1 and depending on the type of memory 14, video data on path 58 is temporarily buffered in a FIFO 42 before entering on path 62, a VLC decoder 44. The primary function of FIFO 42 is to prevent VLC underrun and in some embodiments FIFO 42 will not be needed. Inverse quantitizer, IQ, 46 is coupled to the VLC decoder. An inverse discrete cosine transformer, IDCT, 48 is coupled to the IQ. Motion compensator 52 performs whatever motion compensation is required by accessing the decoded data stored in frame buffer 50 on path 78 and adding or subtracting in adder 54 decoded difference signals supplied on coupling 72 to the IDCT, and motion compensation signals supplied on coupling 76. The output of adder 54 is sent to frame buffer 50 on coupling 74. As noted above, frame buffer 50 may be a part of memory 14. Frame buffer 50 may accommodate one or more frames of decoded data but preferably includes three frames. One frame buffer stores the current frame while one each stores a past and future reference frame in accordance with MPEG-2 encoding/decoding standards. Busy circuit 56 monitors the decoding process in units 44, 46, 48 and 52 on path 66. When all units have completed their portion of decoding a slice the busy signal 68 is de-activated to notify the stream slicer that another slice can be allocated to this decoder. Busy signal 68 and busy circuit 56 for generating it are understood to include a request signal where slice decoder 40 can request another slice to decode when it has completed the decoding of a first slice, or a status signal which indicates that slice decoder 40 is available or not available to accept and decode another slice. In some embodiments the presence of a request signal will be used by stream slicer 18 rather than the absence of a busy signal. Such variations are well understood in the art to be equivalent ways of signaling activity in a slice decoder. In one embodiment of the present invention, if all decoders are busy, stream slicer 18 allocates a slice to the first available decoder. This can be determined by looking which busy signal is de-activated first.

Figure 3:
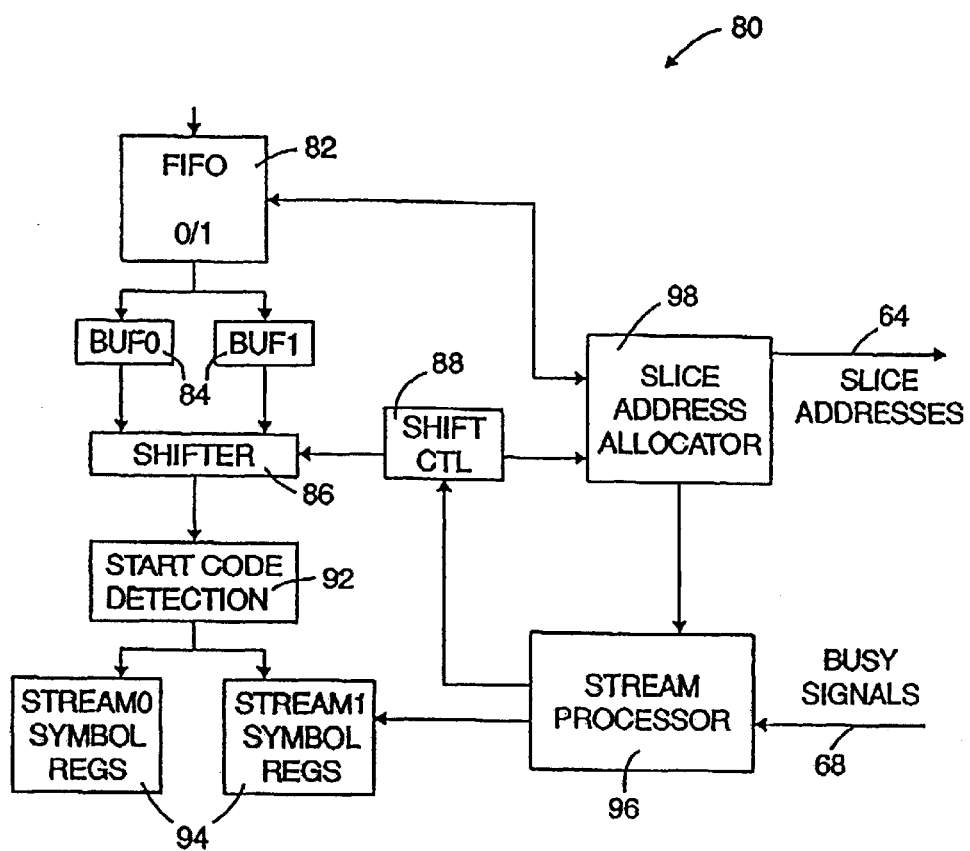
FIG. 3 is an expanded block diagram showing one embodiment of the video stream slice of FIG. 1 which is capable of processing two video streams.

An embodiment 80 of a stream slicer is shown in FIG. 3. Video data of either a single stream or multiple streams is temporarily buffered in FIFO 82. The size of FIFO 82 is dependant on the data rates and speed of the incoming data. In some embodiments, FIFO 82 may not be needed. Slice addresses in the incoming data are kept track of in slice address allocator 98. The video data is further buffered in one or more buffers 84. Shifter 86 under control of shift controller 88 rapidly passes a data stream to start code detector 92. High Level symbols which may apply to all slices in a video stream are stored in one or more symbol registers 94. Symbols represent encoded parameters used in decoding a video stream. Examples of high level symbols are picture size, frame rate, bit rate and aspect ratio. Stream processor 96 in conjunction with slice address allocator 98 controls the allocation of data slices to slice decoders in response to busy signals 68 and the incoming data by sending slice addresses to slice decoders. High Level symbols can also be sent to slice decoders either at the start of decoding a video data stream or more frequently as needed. For example, a slice decoder which has completed decoding a slice from one data stream may be requested to decode a slice from a second data stream. If the slice decoder can store only one set of high level symbols, then a second set would need to be sent. If the slice decoder is capable of storing multiple symbol sets, then a signal to switch sets would be sent assuming both sets were sent initially. Such options are readily apparent to one skilled in the field.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method for decoding a frame of encoded video data using a multiplicity of decoders connected in parallel, said method comprising:

storing the frame of encoded video data in memory;

controlling retrieval and decoding of the frame of encoded video data using slice addresses of encoded slices in memory comprising the frame of encoded video, said controlling comprising for each encoded slice of said encoded video data:

determining if one of said decoders is currently available to decode said encoded slice, said determining including monitoring said decoders for busy signals, and if one of said decoders is currently available to decode said encoded slice, then forwarding the slice address of the encoded slice to said one decoder, said one decoder using said slice address to retrieve said encoded slice from memory and decode said encoded slice to produce a decoded slice, and if none of said decoders is currently available to decode said encoded slice then identifying a first one of said decoders to become available to decode said encoded slice, said identifying including noting the absence of a busy signal from said first one of said decoders, and then forwarding the slice address of the encoded slice to said first one of said decoders, said first one of said decoders using said slice address to retrieve said encoded slice from memory and decode said encoded slice to produce a decoded slice; and synchronizing assembly of decoded slices into a decoded frame.

2. A method as set forth in claim 1 wherein there is no predetermined order for said decoders to decode said encoded slices.

3. A method as set forth in claim 1 wherein said identifying a first one of said decoders to become available to decode said encoded slice and then said first one of said decoders decoding said encoded slice are not based on any predetermined order of said decoders.

4. A method as set forth in claim 1 wherein each of said decoders includes a circuit to determine if said each decoder is busy, and further comprising said circuit providing said busy signal to said controlling, said busy signal indicating that a respective decoder is busy/not available.

5. A system for decoding a frame of encoded video data, said system comprising:

a multiplicity of decoders connected in parallel;

means for storing the frame of encoded video data in memory;

means for controlling retrieval and decoding of the frame of encoded video data using slice addresses of encoded slices in memory comprising the frame of encoded video data, said means for controlling comprising for each encoded slice of said encoded video data:

means for determining if one of said decoders is currently available to decode said encoded slice, said determining including monitoring said decoders for busy signals, and if one of said decoders is currently available to decode said encoded slice, then forwarding the slice address of the encoded slice to said one decoder, said one decoder using said slice address to retrieve said encoded slice from memory and decode said encoded slice to produce a decoded slice, and if none of said decoders is currently available to decode said encoded slice, then means for identifying a first one of said decoders to become available to decode said encoded slice, said identifying including noting the absence of a busy signal from said first one of said decoders, and then forwarding the slice address of the encoded slice to said first one of said decoders, said first one of said decoders using said slice address to retrieve said encoded slice from memory and decode said encoded slice to produce a decoded slice; and synchronizing assembly of decoded slices into a decoded frame.

6. A system as set forth in claim 5 wherein each of said decoders includes a circuit to determine if said each decoder is busy.

7. A system as set forth in claim 5 wherein there is no predetermined order for said decoders to decode said encoded slices, and said means for identifying a first one of said decoders to become available to decode said encoded slice and then said first one of said decoders decoding said encoded slice is not based on any predetermined order of said decoders.

* * * * *